United States Patent
Lee et al.

(10) Patent No.: US 6,192,344 B1
(45) Date of Patent: Feb. 20, 2001

(54) MESSAGING SERVER LANGUAGE CONFIGURATION METHOD AND APPARATUS

(75) Inventors: Scott Lee; Thiagarajan Rajagopalan; Chiaming Jen, all of Fremont, CA (US)

(73) Assignee: Altigen Communications, Inc., Fremont, CA (US)

( * ) Notice: Under 35 U.S.C. 154(b), the term of this patent shall be extended for 0 days.

(21) Appl. No.: 09/215,642

(22) Filed: Dec. 16, 1998

(51) Int. Cl.$^7$ .............................. G10L 11/00; G06F 15/16

(52) U.S. Cl. .................... 704/277; 704/270; 704/278; 709/204; 709/206

(58) Field of Search ................................ 704/277, 6.8, 8, 704/278; 379/214, 84, 903, 88.08, 88.05, 88.04, 88.06; 703/26, 27; 707/200, 8; 709/204

(56) References Cited

U.S. PATENT DOCUMENTS

| | | | |
|---|---|---|---|
| 4,949,302 | * 8/1990 | Arnold et al. | 707/200 |
| 5,619,554 | * 4/1997 | Hogan et al. | 379/88.1 |
| 5,966,685 | * 10/1999 | Flanagan et al. | 707/8 |
| 5,974,372 | * 11/1999 | Barnes et al. | 704/8 |

OTHER PUBLICATIONS

Croft et al ("Applications of Multilingual Text Retrieval," Proceedings of 29th Annual Hawaii International Conference on System Sciences, Jan. 1996).*

Javkin et al ("A Multi–lingual Text–to–Speech System," International Conference on Acoustics, Speech and Signal Processing, May 1989).*

Creative Labs ("Text Assist™ User's Guide," Feb. 1994).*

IBM® Technical Disclosure Bulletins "Method of Generating Message Catalog Text of the Correct Language for each Product," vol. 34 No. 2, Jul. 1991.*

IBM® Technical Disclosure Bulletins "Method for user–selectable Recallable Archive of Phone Messages," vol. 37 No. 01, Jan. 1994.*

IBM® Technical Disclosure Bulletins "Storage and Handling of System Operator Prompts and Messages," vol. 20 No. 2, Jul. 1977.*

(List continued on next page.)

*Primary Examiner*—Richemond Dorvil
*Assistant Examiner*—Daniel A. Nolan
(74) *Attorney, Agent, or Firm*—Townsend and Townsend and Crew LLP

(57) ABSTRACT

A method for adding a spoken language for output generated by a messaging program including a voice messaging program and a voice messaging program running without re-compiling the messaging program includes providing the voice messaging program configured to generate an output message, providing the language server to receive the output message, to receive an ordered plurality of phrase references, to use phrase references from the ordered plurality of phrase references to identify a plurality of spoken phrases, and to output the plurality of spoken phrases, installing a set of language configuration data in a directory in the memory, the set of language configuration data configured to specify an ordered plurality of phrase references to the language server in response to the output message, installing a set of phrase files in a second directory in the memory, each phrase file in the set having an associated phrase reference and configured to store a unique spoken phrase, the set of language configuration data and the set of phrase files both associated with a spoken language, receiving a request in the messaging program to use the spoken language for the messaging program, and configuring the language server to refer to the second directory in the memory and to use the ordered plurality of phrase references as the ordered plurality of phrase references and to refer to the set of phrase files for the plurality of spoken phrases, in response to the request, wherein the messaging server is not recompiled after installing the set of language configuration data or after installing the set of phrase files.

20 Claims, 5 Drawing Sheets-

OTHER PUBLICATIONS

IBM® Technical Disclosure Bulletins "Method and Apparatus for Categorizing Phone Messages," vol. 37 No. 01, Jan. 1994.*

IBM® Technical Disclosure Bulletins "Multi–lingual ADF Applications," vol. 34 No. 2, Apr. 1986.*

IBM® Technical Disclosure Bulletins "Multilingual System Messages and Screens on a Single Computer," vol. 34 No. 2, May 1985.*

IBM® Technical Disclosure Bulletins "Multiple Language Display for Terminals," vol. 18 No. 8, Jan. 1976.*

* cited by examiner

MESSAGING SERVER LANGUAGE CONFIGURATION METHOD AND APPARATUS

BACKGROUND OF THE INVENTION

The present invention relates to messaging servers. More specifically, the present invention relates to methods for dynamically changing the language used by messaging servers. Typical messaging servers provide users audio and/or textual output and the like.

It has been said that the computer age has brought users of different nationalities throughout the world closer than ever before. However, this seems to only be true if the user speaks English. In reality, the majority of the people on this world read, write, and speak in different languages. Because of these language differences, products that are destined for international markets must speak the local language to be successful.

In the past, computer applications were written using English as the language for communicating with the user. For example, for textual output, for audio output, and the like. In order to modify the computer application to operate with another human language, the application had to first be re-written with user messages in the other language. Next, the application had to be re-compiled and tested.

Drawbacks to this method include that the company writing the computer program was required to re-compile the program for every language desired, and that they had to release specific versions of the program for each language. Another drawback was that the time-to-market for the computer program would suffer because re-compiling and re-testing was often a time consuming process.

In order to address the above problems, an alternative method was developed. In this method, user messages were written in as many different languages as possible and then computer program was compiled. As a result, a user of the computer program could switch back and forth from different languages without having different versions of the program. Typical source code of computer programs having the all-in-one approach could resemble the following code:

If (language=ENGLISH) then
       Play_English_Prompt ("you have")
       Play_English_Number(<number>)
       Play_English_Prompt("e-mail messages")
    Else if (language=JAPANESE) then
       Play_Japanese_Number(<number>)
       Play_Japanese_Prompt("e-mail messages")
       Play_Japanese_Prompt("you have")
    Else if (language=German ) . . .

Drawbacks to this approach include that such all-in-one applications typically require excessive amounts of computer storage space. For example, because most users in the United States will only use the English language when running a computer program, the instruction codes and the capability to use other languages is never used. As a result, a great deal of RAM and Hard Disk requirements for a computer program is wasted. Yet another drawback is that if any new languages are to be added to the computer program, the entire computer program must still be recompiled. Another drawback to this approach was that it was very error prone, because minor changes meant updating all versions of the program.

In light of the above, what is needed are efficient methods for dynamically configuring messaging servers for different languages.

SUMMARY OF THE INVENTION

The present invention discloses methods and apparatus for dynamically configuring languages for output from messaging servers. Further understanding of the nature and advantages of the invention may be realized by reference to the remaining portions of the specification and drawings.

According to an embodiment of the present invention, a method for changing a spoken language for output generated by a messaging program running on a computer system having a memory, without re-compiling the messaging program, includes providing the messaging program to the computer system, the messaging program configured to generate an output message, providing a language server coupled to the messaging program to the computer system, the language server configured to receive the output message, to receive an ordered plurality of phrase references, to use phrase references from the ordered plurality of phrase references to identify a plurality of spoken phrases, and to output the plurality of spoken phrases, providing a first set of language configuration data coupled to the language server, in a first directory in the memory, the first set of language configuration data configured to specify a first ordered plurality of phrase references to the language server in response to the output message, and providing a first set of phrase files coupled to the language server, in the first directory in the memory, each phrase file in the first set having an associated phrase reference and configured to store a unique spoken phrase, the first set of language configuration data and the first set of phrase files both associated with a first spoken language. The method also includes configuring the language server to refer to the first directory in the memory and to use the first ordered plurality of phrase references as the ordered plurality of phrase references and to refer to the first set of phrase files for the plurality of spoken phrases. The steps of installing a second set of language configuration data coupled to the language server, in a second directory in the memory, the second set of language configuration data configured to specify a second ordered plurality of phrase references to the language server in response to the output message, and installing a second set of phrase files coupled to the language server, in the second directory in the memory, each phrase file in the second set having an associated phrase reference and configured to store a unique spoken phrase, the second set of language configuration data and the second set of phrase files both associated with a second spoken language, are also provided. The method also includes receiving a request in the messaging program to use a secondary spoken language for the messaging program, and configuring the language server to refer to the second directory in the memory and to use the second ordered plurality of phrase references as the ordered plurality of phrase references and to refer to the second set of phrase files for the plurality of spoken phrases, in response to the request.

According to another embodiment, a computer system, including an application program configured to output messages to a user in user-selectable languages without terminating the application program, includes a processor; and a computer readable memory: The computer-readable memory includes a first table for a first language, the first table indexed by the user messages, and indicating a first set of file references in response to a user message, a first set of files having associated file references for storing phrases in a first language, a second table for a second language, the second table indexed by the user messages, and indicating a second set of file references in response to the user message, and a second set of files having associated file references for storing phrases in a second language. The memory also stores code that directs the processor to receive an output message from the application program, code that directs the processor to receive a selection from a plurality of languages comprising the primary language and the secondary language, code that directs the processor to refer to the first table and to return the first set of file references in response to a selection of the primary language, and code that directs the processor to retrieve files from the first set of files in response to file references from the first set of file references, in response to the selection of the primary language. Code that directs the processor to refer to the second table and to return the second set of file references in response to a selection of the secondary language, code that directs the processor to retrieve files from the secondary set of files in response to file references from the secondary set of file references, in response to the selection of the secondary language, and code that directs the processor to output the files to the user are also provided.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF THE SPECIFIC EMBODIMENTS

System Overview

Figure 1:
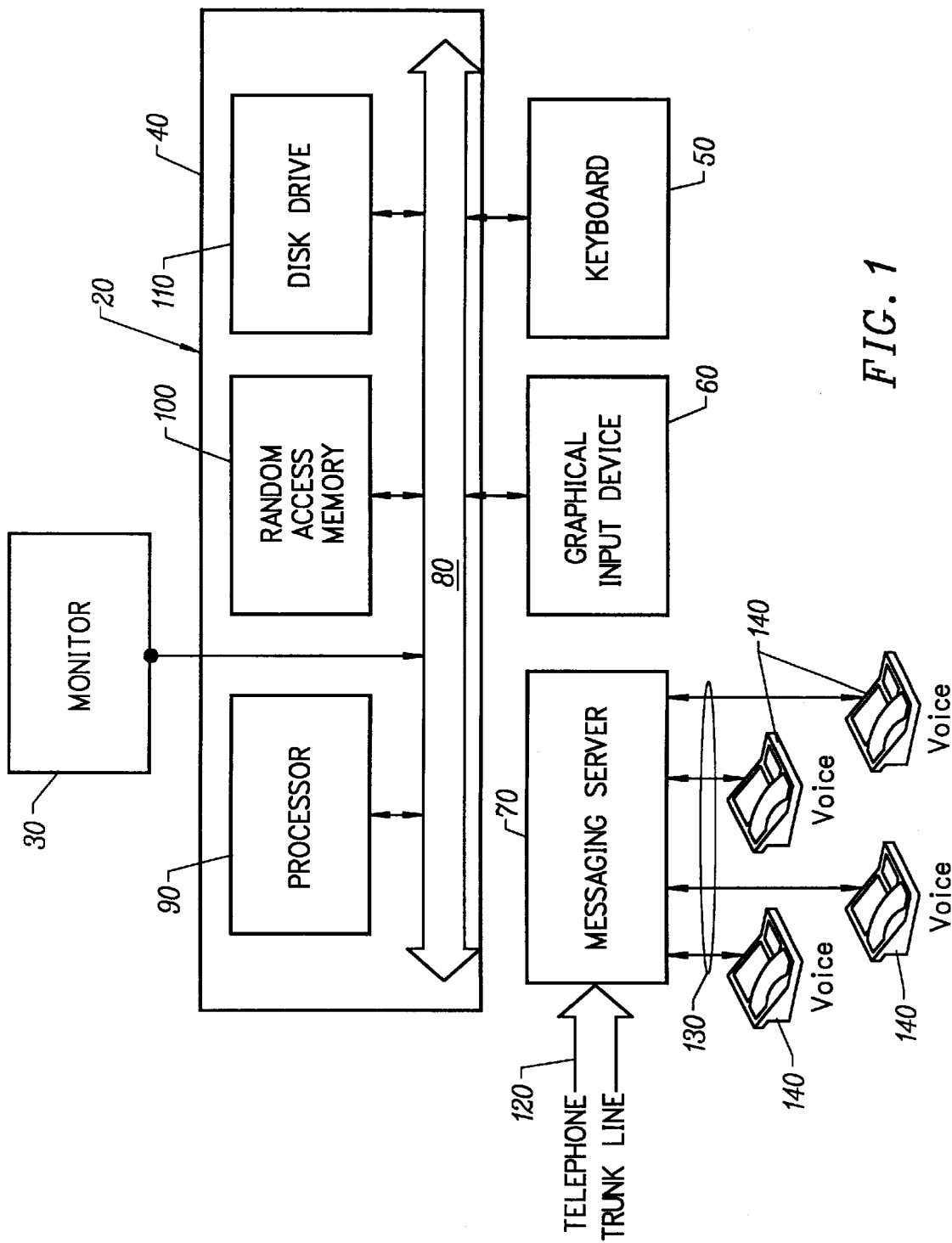
FIG. 1 is a block diagram of a messaging system according to a preferred embodiment of the present invention.

FIG. 1 is a block diagram of a messaging system 20 according to a preferred embodiment of the present invention. Messaging system 20 includes a monitor 30, a computer 40, a keyboard 50, a graphical input device 60, and a messaging server 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to messaging server 70. Handsets 140 may be coupled to individual telephone lines 130.

Handsets 140 are preferably analog signal telephone handsets, however alternatively they may be any well known type of digital or analog telephone handset. A mouse is but one example of an input device 370, also known as a pointing device. Other types of input devices may include trackballs, drawing tablets, microphones (for voice activated input), and the like. Messaging system 20 may be coupled to a computer network through use of a network interface, not shown, such as an Ethernet card, a modem, and the like.

RAM 100 and disk drive 110 are examples of tangible media or physical memory storage for storage of data, message files, voice prompt files or phrase files, computer programs such as embodiments of the herein described methods, and the like. Other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, messaging system 20 includes an IBM PC compatible computer having a '586-class based microprocessor, such a Pentium™ microprocessor from Intel Corporation. Further, in the present embodiment, messaging system 20 operates utilizing the WindowsNT™ operating from Microsoft Corporation, to run AltiWare™ software from AltiGen Communications, Inc. Messaging server 70 is preferably embodied as a Quantum™ ISA based plug-in expansion board from AltiGen Communications, Inc. Other buses can be used in alternative embodiments, including the PCI bus, EISA bus, and the like.

FIG. 1 is representative of but one type of system for embodying the present invention. It will be readily apparent to one of ordinary skill in the art that many system types of hardware and software configurations are suitable for use in conjunction with the present invention. For example, messaging system 20 may operate under the LINUX operating system, may be ported onto a PowerPC G3™ class microprocessor computer running MAC OS 8.5 from Apple Computer Corporation, and the like.

Hardware Description

Figure 2:
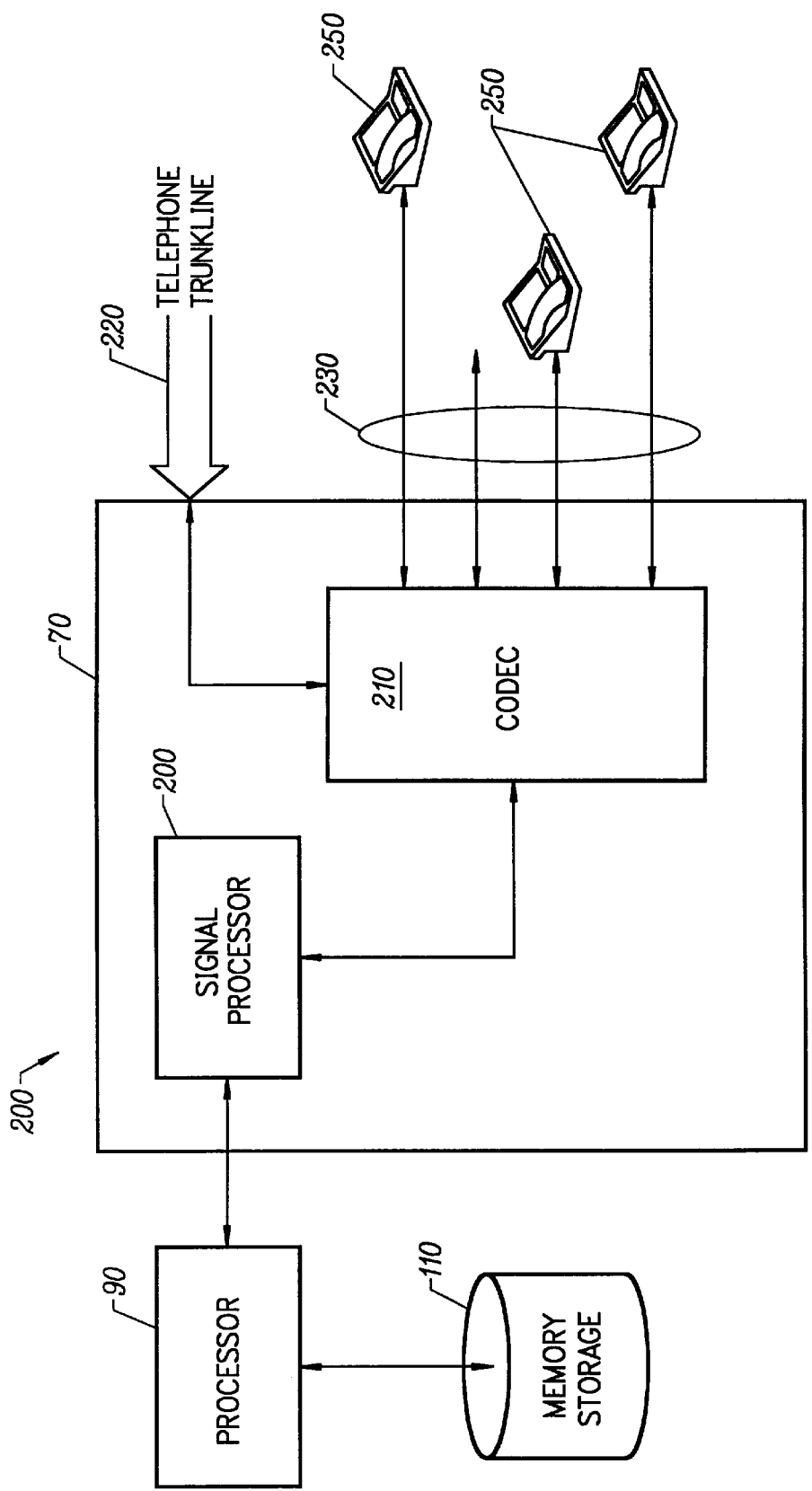
FIG. 2 is a more detailed block diagram of a portion of a messaging system according to an embodiment of the present invention.

FIG. 2 is a more detailed block diagram of a portion of a messaging system according to an embodiment of the present invention. Referring to FIG. 1, FIG. 2 illustrates processor 90, disk drive ( more generally a memory storage 110, and messaging server 70. In the present embodiment, messaging server 70 includes a signal processor 200, and a digital to analog and analog to digital coder (codec) 210. The messaging system interfaces with telephone trunk lines 220 and with telephone extension lines 230. In turn, telephone extension lines 230 are coupled to telephone handsets 240.

In the present embodiment, memory storage 110 is used to store a language server, as will be described further below, language passage tables, language property rule tables, voice prompt or phrase files, audio messages in the form of message files, and the like, as will be described later.

In FIG. 2, processor 90 is used to control the operation of messaging server 70 according to instructions from the AltiWareθ software previously described. In one embodiment of the present invention, AltiWareθ software, operates in a multithreaded multi-tasking environment, where each thread monitors the status of a particular telephone extension line 230. The status of the particular telephone extension line is typically represented as a state machine in the software.

In the present embodiment, processor 90 is also used to convert incoming audio messages to message files in a storage format, and to convert messages files and voice prompt files from the storage format to an output format (typically digital signals). In the present embodiment, two specific storage formats could be used and include the well-known ".wav" file format, and a pulse coded modulation scheme (PCM).

In other embodiments of the present invention, a single storage format may be used. In other embodiments, other formats for storage of audio messages and the like are known to those of ordinary skill in the art can be used. For example, formats such as the "RealAudio" format, MP3, and the like may be also be used in embodiments of the present invention.

Signal processor 200 is embodied as a Texas Instruments TMS320C5X digital signal processors (DSPs), and is coupled to receive instructions, and the like from processor 90. Of course other DSPs may be used in other embodiments of the present invention.

In the present embodiment, signal processor 200 provides telephone switching functionality to each telephone extension line. For example, in this embodiment, signal processor 200 is used to detect off-hook conditions, to provide tone generation, to detects and process key-pad tones generated from each telephone handset 240, and the like.

Signal processor 200 typically comprises a multi-process environment wherein each process monitors the status of a particular telephone extension line 230. The status of the particular telephone extension line is represented as a state machine within the signal processor 200. In one embodiment of the present invention, signal processor 200 can process up to twelve telephone extension lines being simultaneously in off-hook conditions. In alternative embodiments, monitoring of a greater or fewer number of telephone extension lines 230 is contemplated.

As illustrated in FIG. 2, codec 210 is used to provide an interface between users on telephone extension lines 230 and messaging system 200. In the present embodiment, codec 210 digitizes analog messages and analog signals from users on telephone extension lines 230 and, as illustrated, Telephone Trunk Line 220. Codec 210 also converts digital signals from processor 90 into analog signals for users on telephone extension lines 230. In the present embodiment, the analog signals include audio messages to and from users, dial tone and multifunction (DTMF) tones, and the like. The analog signals also include voice prompts or phrases that provide voice prompting capability to users on telephone extension trunk lines 220 and telephone lines 250. Examples of voice prompts or phrases, include messages that instruct the user which keys on a telephone to select to perform particular functions, messages that tell the user how many messages are pending, and the like.

Software Description

Figure 3:
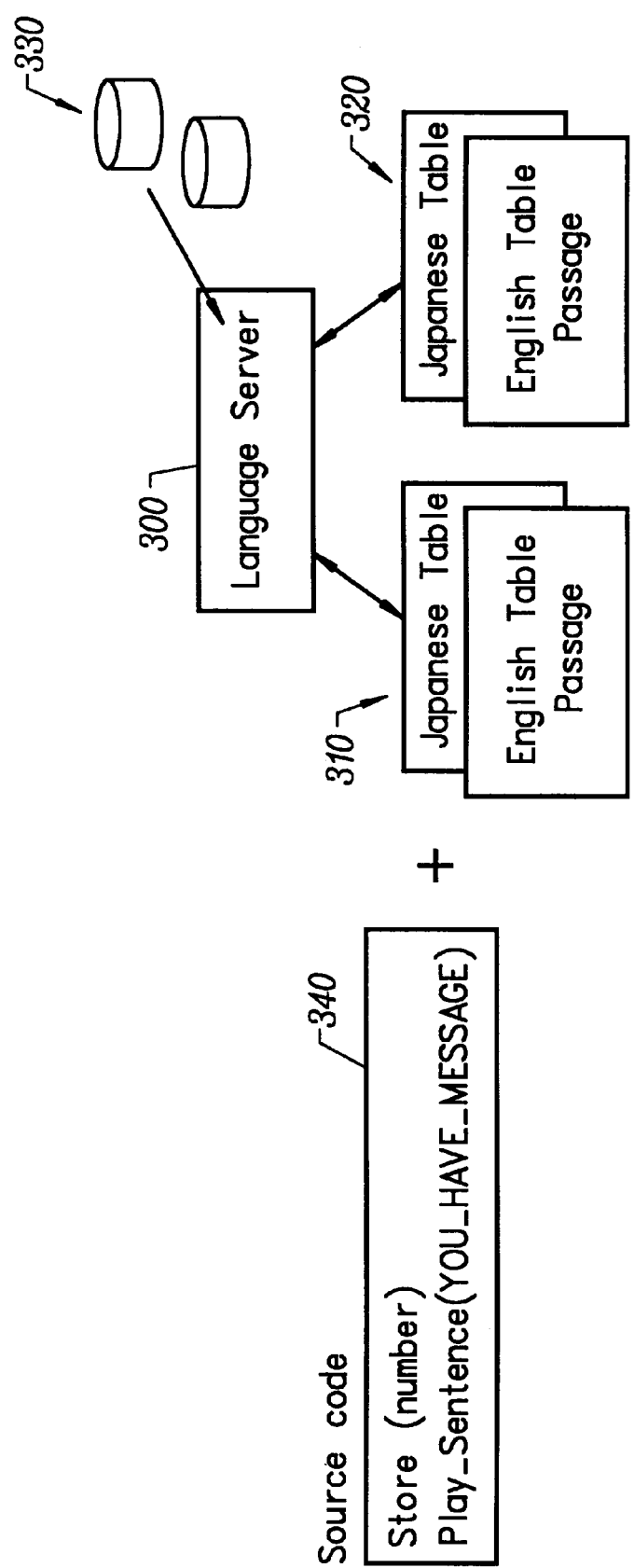
FIG. 3 illustrates a conceptual block diagram of an embodiment of the present invention.

FIG. 3 illustrates a conceptual block diagram of an embodiment of the present invention. FIG. 3 includes a language server 300, language passage tables 310, language property rule tables 320, and phrase files 330. Also illustrated in FIG. 3 is a portion 340 of source code of a computer program generating a message for the user.

Language server 300 is embodied as a C++ language computer program that receives requests from the computer program for user output, and directs the output of messages in the user selected language. Language server 300 is illustrated coupled to language passage tables 310, language property rule tables 320, and to phrase files 330. Together, language passage tables 310 and language property rule tables 320 are typically referred to generally as language configuration data. Upon a request from the computer program, language server 300 retrieves syntax rules from a language passage table 310 and language convention data from a language property rule table 320. In response to the inputs from the tables, language server 300 retrieves phrase files specified by the language configuration data and outputs the data stored within the phrase files to the user as a spoken passage.

The language passage tables 310, in the present embodiment, are used to store language syntax rules. For example, an English language passage table would specify the generation of a passage of a message in English as follows: "you have five old messages." In contrast, a Japanese language passage table would specify the generation of a passage of the same message in Japanese as follows: "five messages you have." Many other examples of different syntax between languages are easily envisioned. In the present embodiment, each of the language passage tables 310 typically specify the correct syntax in the language desired, for each message (passage) desired.

In one embodiment of the present invention, the language passage tables are indexed by the user message. For example, if the computer program has 500 predefined user messages, the language passage table will also have 500 table entries. A greater or fewer number of table entries are contemplated in alternative embodiments of the present invention. Each table entry typically comprises a series of phrase references that form a passage. In this embodiment, each phrase reference is a number. Using the example above, the user message "You__have__message." indexes an entry in an English language passage table that includes the following ordered phrase reference numbers: 4174, 4292, 4175, 4030, and the like. The same message also indexes an entry in an Japanese language passage table that includes the following ordered phrase reference numbers: 4003,1001, 4595, 1001, 4030, and the like. As another example, the phrase reference numbers could be 4003, N1, 4004, and 4005. In this example message, in the English directory, 4003 is "You have", 4004 is "new", and 4005 is "messages". N1 is a numeric variable, such as "23." The value for N1 is translated to a voice phrase based upon the property rule table. For example, the phrase files "twenty" and "three." In Japanese, the phrase reference numbers could be N1, 4004, 4005, and 4003. In this example, the Japanese directory also stores the Japanese equivalent of "new" in 4004, "messages" in 4005, and "new" in 4003. N1 would also be translated to a voice phrase based upon the Japanese property rule table.

In FIG. 3, the language property rule tables 320, are used to store rules or conventions associated with each language. Types of rules include how to specify the date, the time, numbers, etc. For example, an American English language property rule table would specify the time in English as: "three PM"; whereas a British English language property rule table would specify the time in English as: "fifteen O'clock." Many other examples of different rules or conventions between languages are easily envisioned. In the present embodiment, each of the language property rule tables 320 typically specify the correct rule in the language desired, for user messages. Not all user messages are required to have such formatting.

In the present embodiment, phrase files 330 are provided for each output language desired. In this example, there would be one set of phrase files for English and one set of phrase file for Japanese, and the like. Typically each phrase file includes a digitized audio sample of a word spoken in a given language. For example, one phrase file in English would include the spoken word "message", another would include the word "busy"; one phrase file in Japanese would include the spoken word "ichi", and the like. The phrase files for a particular language have unique files name. In this embodiment, language server 300 retrieves the phrase files for a selected language and outputs the stored audio sample to the user.

In the present embodiment, the audio sample is a stored using a pulse coded modulation (PCM) scheme. Although in other embodiments of the present invention, other audio formats can be used, for example, a ".WAV" format, an "MP3" format, and the like.

In the present embodiment, for each language, a directory is created. Each directory includes the language passage table, the language property table, and the phrase files for a particular language. As an example, directories such as "\altiserv\phrases\lang1", "\altiserv\phrases\lang2", "\altiserv\phrases\lang3", and the like may be created.

As illustrated in FIG. 3, in the present embodiment, the output language used by the computer program is not bound to the source code. In this embodiment, the computer program does not care which spoken languages are used for output. The computer program has a default language, a secondary language, a tertiary language, and the like. It is preferred that the computer program does not care whether the default language is French, German, Japanese, or the like, or whether the secondary language is English, Spanish, Chinese, and the like.

As a default, computer program instructs language server 300 to refer to the language passage table, the language property table, and the phrase files that reside in a default directory. In the example above, the directory could be "\altiserv\phrases\1." In this embodiment, the language associated with that directory can be set and changed at any time. For example, if the default language should be Mainland Chinese, the language passage table, the language property table, and the phrase files are all set for Mainland Chinese.

When another language is desired, in addition to the default language, computer program instructs language server 300 to refer to the language passage table, the language property table, and the phrase files that reside in another directory. Continuing the example above, the directory could be "\altiserv\phrases\2." In this embodiment, the language passage table, the language property table, and the phrase files associated with American English can be stored in the second directory.

As indicated above, the default language for the computer program can be changed by simply substituting tables and files associated with another language. Further, the secondary, tertiary, and the like other languages can also be changed by substituting tables and files associated with other languages. In one embodiment, the contents, i.e. language, within a directory may be freely interchanged with other contents, i.e. other languages, without quitting and restarting, the computer program, or even without rebooting the system.

In the above embodiments, having separate directories for each language allow a modular approach to changing and updating output language. Further, by providing different directories, phrase filenames can be duplicated for each language.

Figure 4:
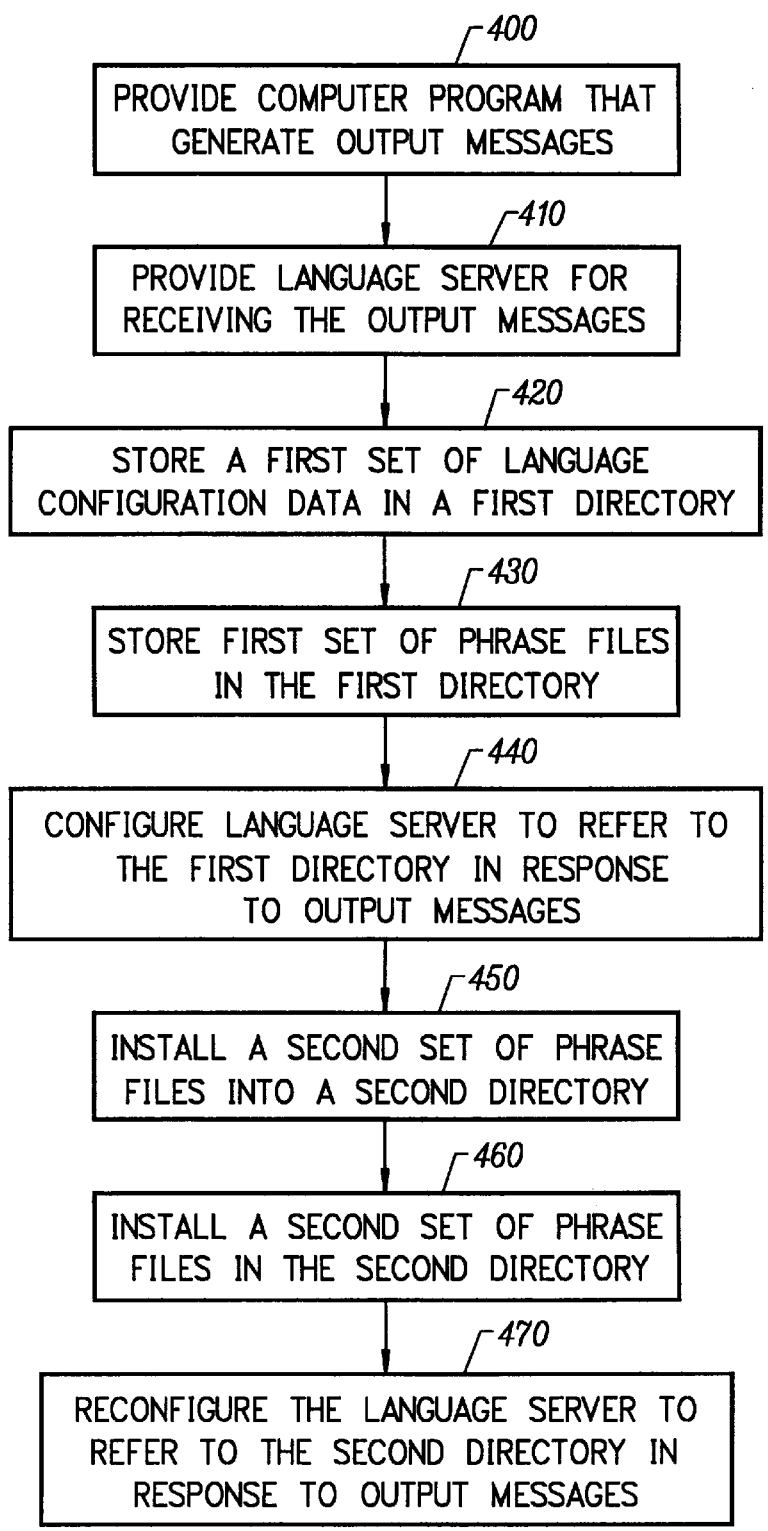
FIG. 4 illustrates a flow diagram of a method according to the present embodiment.

FIG. 4 illustrates a flow diagram of a method according to the present embodiment.

Initially, a computer program is provided that generates an output message and a language selection, step 400. In the present embodiment, the computer program is a voice messaging program. Next, a language server is provided to receive the output message and the language selection from the computer program, step 410. In one embodiment, the language server may be a stand-alone program, whereas in another embodiment, the language server may be a module of the computer program.

Typically a default (or primary) language directory is created and a first set of language configuration data, associated with a first language is stored therein, step 420. As described in the embodiment above, the language configuration data may be in the form of the language passage table, and the language property table. In alternative embodiments, the tables may be merged into one table, or broken into multiple tables. As described above, the language configuration data receives the output message and returns an ordered list of phrase filenames.

Next, the set of phrase files having data stored in the first language is provided into the default language directory, step 430. As described above, these phrase files are referenced by their phrase filenames. The language server is then configured to refer to the default directory in response to output messages from the computer program, step 440.

A secondary language directory is then created and a second set of language configuration data, associated with a second language is installed therein, step 450. As described above, the language configuration data receives the output message and returns an ordered list of phrase filenames.

Next, the set of phrase files having data stored in the second language is installed into the secondary language directory, step 460. As described above, these phrase files are referenced by their phrase filenames, similar to the default directory.

Next, the user generates a request of the computer program to generate output messages in a secondary language, step 470. In response, the language server is then configured to refer to the secondary directory in response to output messages from the computer program, step 480.

Figure 5:
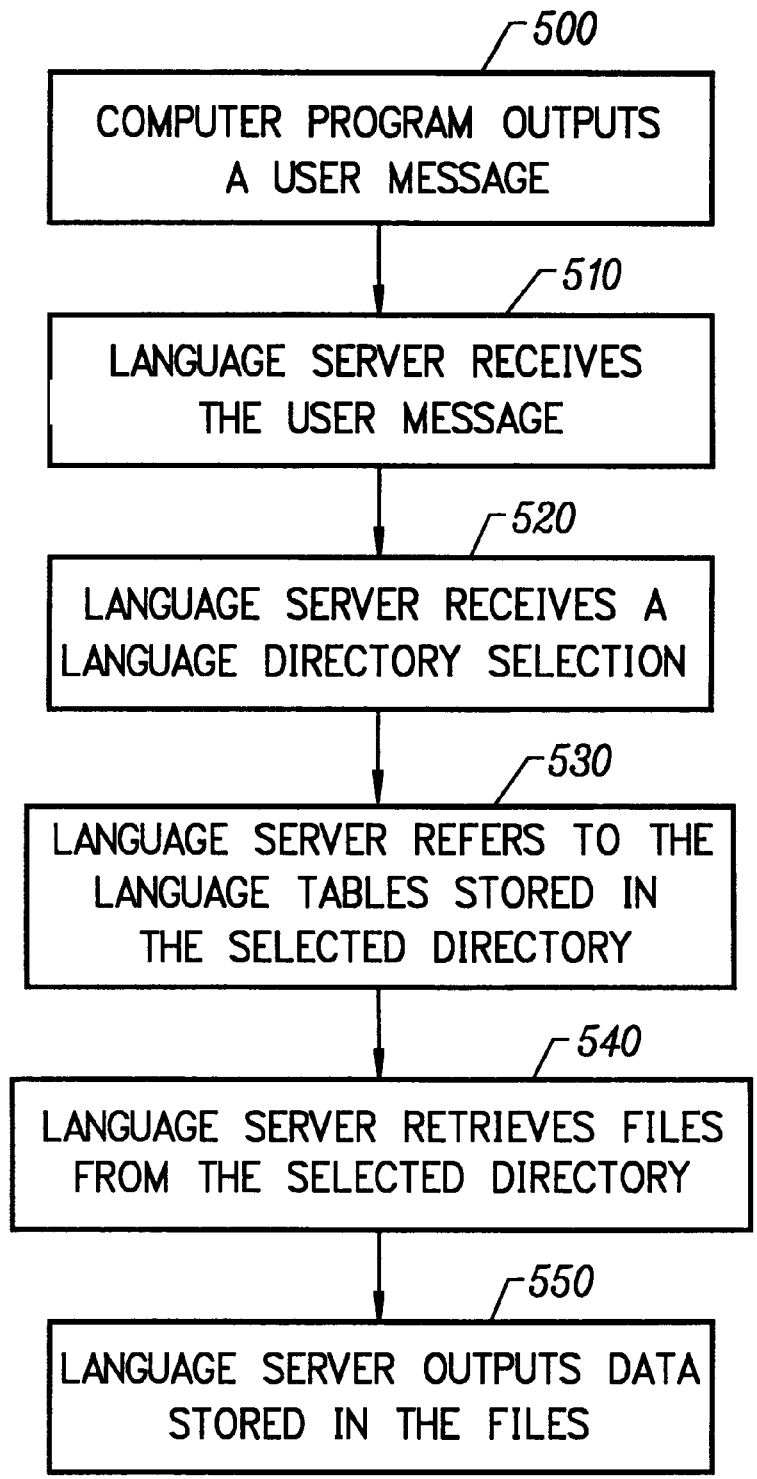
FIG. 5 illustrates another flow diagram of a method according to the present embodiment.

FIG. 5 illustrates another flow diagram of a method according to the present embodiment.

Initially, the computer program outputs a user message, step 500. The language server receives the user message, step 510. The language server also receives a directory selection, step 520.

Next, based upon the directory selection, the language server refers to the language tables in the selected directory to identify a set of phrase filenames, step 530.

The language server serially retrieves files in the selected directory specified by the set of phrase filenames, step 540. The language server then outputs to the user the contents of the retrieved files, step 550.

Further details regarding the present embodiment are found in the document attached in the Appendix entitled "AltiWare Languages Server High Level Design Specification.

Conclusion

As illustrated above, the amount of development time required by embodiments of the above invention to add support for a new language is significantly reduced. Because, the source code of the application need not be modified for different languages, the same application can support multiple languages.

In the foregoing specification, the invention has been described with reference to specific exemplary embodiments thereof. Many changes or modifications are readily envisioned. For example, instead of having a set of phrase files for one language, one embodiment can simply include a single phrase file for the one language. In such an embodiment, the language server would simply refer to different entries within the single phrase file in order to retrieve the appropriate voice samples.

In another embodiment, phrase files for different languages may have unique filenames, thus all phrase files can be put into a common directory. For example, one directory can include a file representing "one" in English can have a filename of "e3345", and in Spanish can have a filename of "s9983."

The presently claimed invention may also be applied to other areas of technology such as textual computer output. In such embodiments, output text can be stored with the above described "phrase files," For example, when an application program in computer system outputs a message such as "the blue pen", in English it would read "the blue pen", where as in another language, such a French it would read "le stylo bleu."

In light of the presently described application, it can be seen that embodiments of the present invention may be applied to other computer programs requiring different user output. For example, instead of speech output for the present embodiment, textual output can be provided. For example other applications can include: text output for web-based publishing applications; visual output, such as images of national flags, national symbols, and the like; audio output, such as national anthems, speech output, and the like.

Further, embodiments of the present invention may be applied to different hardware platforms than that illustrated above.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for adding a spoken language for output generated by a messaging program comprising a voice messaging program running on a computer system having a memory, the method comprising:

providing the voice messaging program to the computer system, the voice messaging program configured to generate an output message;

providing the language server coupled to the voice messaging program to the computer system, the language server configured to receive the output message, to receive an ordered plurality of phrase references, to use phrase references from the ordered plurality of phrase references to identify a plurality of spoken phrases, and to output the plurality of spoken phrases;

providing a first set of language configuration data coupled to the language server, in a first directory in the memory, the first set of language configuration data configured to specify a first ordered plurality of phrase references to the language server in response to the output message;

providing a first set of phrase files coupled to the language server, in the first directory in the memory, each phrase file in the first set having an associated phrase reference and configured to store a unique spoken phrase, the first set of language configuration data and the first set of phrase files both associated with a first spoken language;

configuring the language server to refer to the first directory in the memory and to use the first ordered plurality of phrase references as the ordered plurality of phrase references and to refer to the first set of phrase files for the plurality of spoken phrases;

installing a second set of language configuration data coupled to the language server, in a second directory in the memory, the second set of language configuration data configured to specify a second ordered plurality of phrase references to the language server in response to the output message;

installing a second set of phrase files coupled to the language server, in the second directory in the memory, each phrase file in the second set having an associated phrase reference and configured to store a unique spoken phrase, the second set of language configuration data and the second set of phrase files both associated with a second spoken language;

receiving a request in the messaging program to use a secondary spoken language for the messaging program; and configuring the language server to refer to the second directory in the memory and to use the second ordered plurality of phrase references as the ordered plurality of phrase references and to refer to the second set of phrase files for the plurality of spoken phrases, in response to the request;

wherein the messaging server is not recompiled after installing the second set of language configuration data or after installing the second set of phrase files.

2. The method of claim 1 further comprising:

receiving a request in the messaging program to use the primary spoken language for the messaging program; and configuring the language server to refer to the first directory in the memory and to use the first ordered plurality of phrase references as the ordered plurality of phrase references and to refer to the first set of phrase files for the plurality of spoken phrases, in response to the request.

3. The method of claim 1 further comprising:

replacing the second set of language configuration data with a third set of language configuration data, in the second directory in the memory, the third set of language configuration data configured to specify a third ordered plurality of phrase references to the language server in response to the output message;

replacing the second set of phrase files with a third set of phrase files, in the second directory in the memory, each phrase file in the third set having an associated phrase reference and configured to store a unique spoken phrase, the third set of language configuration data and the third set of phrase files both associated with a third spoken language; and wherein the language server refers to the second directory in the memory, and uses the third ordered plurality of phrase references as the ordered plurality of phrase references and refers to the third set of phrase files for the plurality of spoken phrases, in response to the request.

4. The method of claim 1 further comprising:

installing a third set of language configuration data coupled to the language server, in a third directory in the memory, the third set of language configuration data configured to specify a third ordered plurality of phrase references to the language server in response to the output message;

installing a third set of phrase files coupled to the language server, in the third directory in the memory, each phrase file in the third set having an associated phrase reference and configured to store a unique spoken phrase, the third set of language configuration data and the third set of phrase files both associated with a tertiary spoken language;

receiving a request in the messaging program to use a tertiary spoken language for the messaging program; and configuring the language server to refer to the third directory in the memory and to use the third ordered plurality of phrase references as the ordered plurality of phrase references and to refer to the third set of phrase files for the plurality of spoken phrases, in response to the request.

5. The method of claim 1 wherein the first set of language configuration data comprises a language passage table configured to specify syntax data in response to the output message and a language property table configured to specify format data in response to the output message; and wherein the first ordered plurality of phrase references comprises the syntax data and the format data.

6. The method of claim 1 wherein each phrase file in the first set of phrase files comprise audio samples of spoken phrases.

7. The method of claim 1 wherein the ordered plurality of phrase references comprises a series of filenames of phrase files of the first set of phrase files.

8. A messaging server, including a messaging program, configured to output spoken phrases to a user in different languages, the messaging program configured to generate user messages, comprising:

a language server coupled to the messaging program configured to receive a user message from the messaging program, to receive a set of phrase references, and to output spoken phrases in response to the set of phrase references;

a first language table coupled to the language server configured to specify a first set of phrase references to the language server in response to the user message;

a first set of phrase files coupled to the language server configured to store spoken phrases, each phrase file in the first set of phrase files associated with a phrase reference, the first language table and the first set of phrase files both associated with a first language;

a second language table coupled to the language server configured to specify a second set of phrase references to the language server in response to the user message;

a second set of phrase files coupled to the language server configured to store spoken phrases, each phrase file in the second set of phrase files associated with a phrase reference, the second language table and the second set of phrase files both associated with a second language;

wherein the language server is also configured to receive a first request from the messaging program to use the primary language, and in response thereto the language server is configured to use the first set of phrase references as the set of phrase references;

wherein the language server is also configured to receive a second request from the messaging program to use the secondary language, and in response thereto the language server is configured to use the second set of phrase references as the set of phrase references; and wherein the messaging program is not restarted after receiving the second request.

9. The messaging server of claim 8 wherein the language server is also configured to refer to the first set of phrase files for the spoken phrases in response to the first request; and wherein the language server is also configured to refer to the second set of phrase files for the spoken phrases in response to the second request.

10. The messaging server of claim 8 further comprising:

a third language table coupled to the language server configured to specify a third set of phrase references to the language server in response to the user message;

a third set of phrase files coupled to the language server configured to store spoken phrases, each phrase file in the third set of phrase files associated with a phrase reference, the third language table and the third set of phrase files both associated with a third language; and wherein the language server is also configured to receive a third request from the messaging program to use the tertiary language, and in response thereto the language server is configured to use the use the third set of phrase references as the set of phrase references.

11. The messaging server of claim 8 wherein the first language configuration table comprises a passage table configured to specify language syntax data in response to the user message and a property table configured to specify language specific format data in response to the user message; and wherein the first set of phrase references comprises the syntax data and the format data.

12. The messaging server of claim 8 wherein each phrase file in the second set of phrase files comprise audio samples of phrases.

13. The messaging server of claim 8 wherein the second set of phrase references comprises a series of filenames of phrase files of the second set of phrase files.

14. A computer system, including an application program configured to output messages to a user in user-selectable languages without terminating the application program, comprises:

a processor; and a computer readable memory comprising:

a first table for a first language, the first table indexed by the user messages, and indicating a first set of file references in response to a user message;

a first set of files having associated file references for storing phrases in a first language;

a second table for a second language, the second table indexed by the user messages, and indicating a second set of file references in response to the user message;

a second set of files having associated file references for storing phrases in a second language;

code that directs the processor to detect and receive an output message from the application program;

code that directs the processor to receive a selection from a plurality of languages comprising the primary language and the secondary language;

code that directs the processor to refer to the first table and to return the first set of file references in response to a selection of the primary language;

code that directs the processor to retrieve files from the first set of files in response to file references from the first set of file references, in response to the selection of the primary language;

code that directs the processor to refer to the second table and to return the second set of file references in response to a selection of the secondary language;

code that directs the processor to retrieve files from the secondary set of files in response to file references from the secondary set of file references, in response to the selection of the secondary language; and code that directs the processor to output the files to the user.

15. The computer system of claim 14 wherein the plurality of languages also comprises a tertiary language; and wherein the computer readable memory further comprises:

a third table for a third language, the third table indexed by the user messages, and indicating a third set of file references in response to the user message;

a third set of files having associated file references for storing phrases in a third language;

code that directs the processor to refer to the third table and to return the third set of file references in response to a selection of the tertiary language; and code that directs the processor to retrieve files from the third set of files in response to file references from the tertiary set of file references, in response to the selection of the tertiary language.

16. The computer system of claim 14 wherein the first table comprises a passage table indexed by the user messages and indicating syntax data in response to the user message and a property table configured to specify language specific format data in response to the user message; and wherein the first set of file references comprises the syntax data and the format data.

17. The computer system of claim 14 wherein each file in the first set of files comprise audio samples.

18. The computer system of claim 14 wherein each file in the first set of files comprise textual data.

19. The computer system of claim 14 wherein the first table and the first set of files are resident in a first directory, and the second table and the second set of files are resident in a second directory.

20. The computer system of claim 19 wherein a third directory is provided for a tertiary language.

* * * * *